July 10, 1923.
E. A. RIX
1,461,292
LIQUID MEASURING AND DISPENSING APPARATUS
Filed July 28, 1920
2 Sheets-Sheet 1
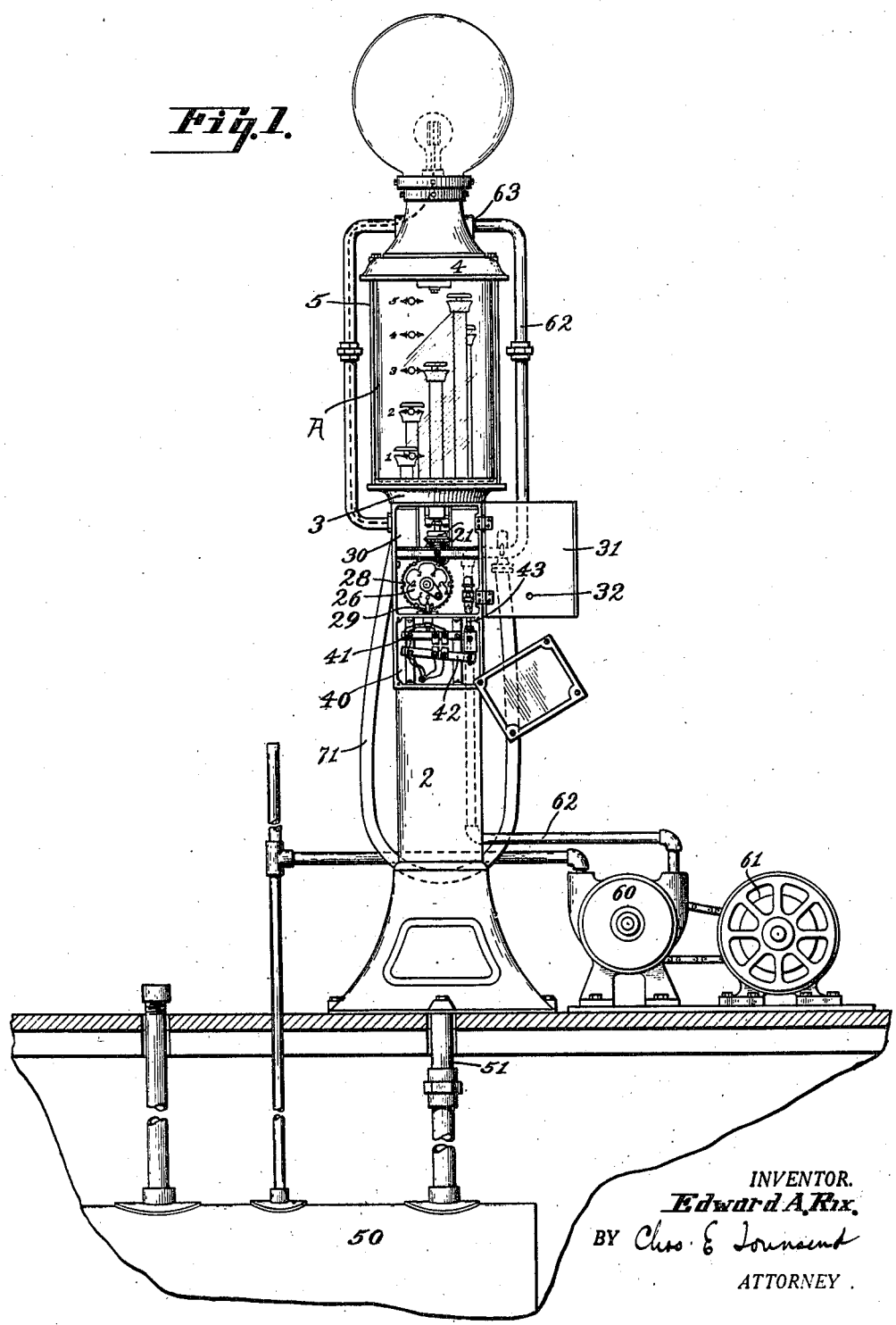
INVENTOR.
Edward A. Rix.
BY Chas. E. Townsend
ATTORNEY.

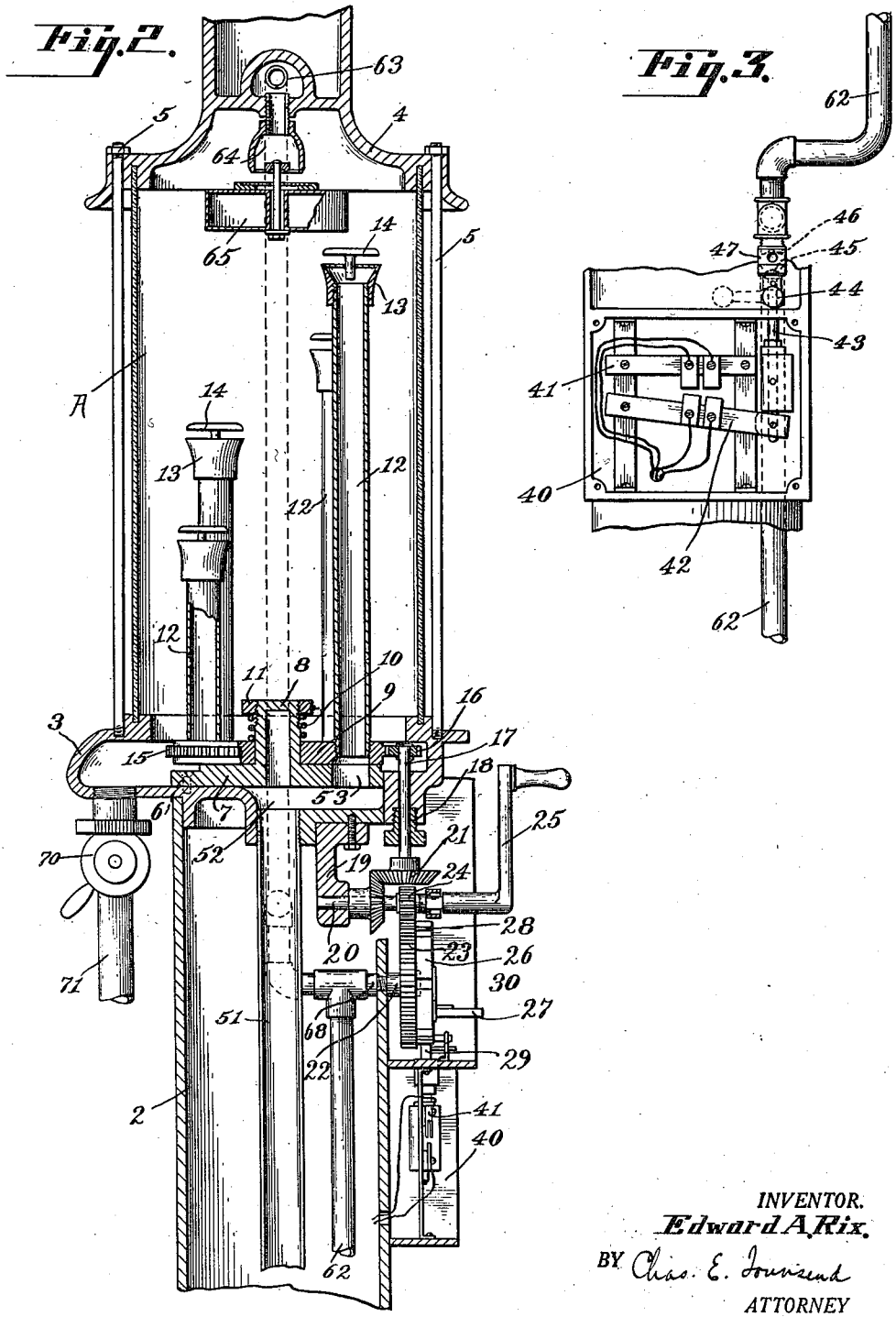

Patented July 10, 1923.

1,461,292

UNITED STATES PATENT OFFICE.

EDWARD A. RIX, OF SAN FRANCISCO, CALIFORNIA.

LIQUID MEASURING AND DISPENSING APPARATUS.

Application filed July 28, 1920. Serial No. 399,499.

*To all whom it may concern:*

Be it known that I, EDWARD A. RIX, a citizen of the United States, residing at the city and county of San Francisco and State of California, have invented a new and useful Improvement in Liquid Measuring and Dispensing Apparatus, of which the following is a specification.

This invention relates to improvements in apparatus for delivering gasoline in measured quantities from a measuring tank which is connected with a main reservoir or source of supply, and adapted to receive the liquid from the source of supply and to measure and visibly indicate the amount delivered to a purchaser or user.

One of the objects of the present invention is to provide a device of the class described having means for measuring the desired amount of liquid to be dispensed and preferably within a transparent casing to permit visible display thereof, said means being capable of ascertaining amounts down to any one of a plurality of predetermined measuring levels.

Another object and one more specifically stated consists in providing a rotor upon which is supported a series of open ended pipes terminating at different levels within the transparent casing and forming combined inlets and overflows whereby the quantity of liquid or gasoline delivered is regulated.

Another object of the invention is to provide an adjusting means for each pipe which may be inspected or corrected by the inspector of measures and weights and sealed when corrected so that false measure or tampering may be entirely avoided.

Another object of the invention is to provide means for turning the rotor to bring any pipe into register with a combined inlet and overflow connection.

Further objects will hereinafter be described.

The invention consists of the parts and the construction, combination and arrangement of parts as hereinafter more fully described and claimed, having reference to the accompanying drawings, in which—

Fig. 1 is a side elevation of the apparatus.

Fig. 2 is an enlarged central vertical section of the measuring tank and the connected actuating mechanism, said section being taken at right angles to Fig. 1.

Fig. 3 is an enlarged detail view of the motor controlling switch and the air controlling valve.

Referring to the drawings in detail, A indicates a visible container which in this instance is supported upon a cylindrical pedestal 2 and an interposed base section 3. The visible container is cylindrical and is constructed of glass. The container is secured to the base section 3 by an upper head member 4 and a plurality of tie bolts 5. Mounted within the base member 3 and secured therein by screws 6 or the like is a bearing plate 7 upon which is formed a central boss 8. Supported by the plate 7 and turnable on the boss 8 is a rotor 9 and adapted to maintain the rotor 9 in frictional engagement with the bearing plate is a spring 10 which is interposed between the rotor and a nut 11, the surfaces of the rotor and bearing plate being ground and scraped to form a liquid tight joint. Formed adjacent the periphery of the rotor is a plurality of openings and screwed into each opening is a pipe 12. These pipes terminate at different levels within the measuring tank A and are open ended. Their upper ends are also threaded and each pipe is provided with an adjusting collar 13 and a deflecting plate 14. Formed on the rotor or secured thereto is a gear 15 and intermeshing therewith is a pinion 16. This pinion is secured on a shaft 17, which is journalled in the base member 3 and extends through a stuffing box 18. Journalled in a bearing bracket 19 secured on the lower side of the base member 3 is a shaft 20, and forming a driving connection between said shaft and the shaft 17 is a pair of bevel gears 21. Journalled in the pedestal directly below the shaft 20 is a second shaft 22. Secured on said shaft is a gear 23 and intermeshing therewith is a pinion 24 which is carried by and secured on the shaft 20. The outer end of this shaft is provided with a square shank and is adapted to receive a removable hand crank 25, the function of which will hereinafter be described.

Secured to the gear 23 on the forward side thereof is an indicating dial 26, and projecting from the face thereof is a pin 27. The indicating dial is marked or numbered from zero up to five and the periphery of the dial is notched as at 28 to permit register with a detent member 29. The several gears, shafts, indicating dial and connected mechanism are mounted within a chamber 30 formed below the base member 3 or in the upper part of the pedestal. This chamber is adapted to be closed by a door 31 and this door can only be closed when the dial 26 is turned to zero position as the pin on the dial will not permit closing of the door except when it registers with an opening 32 formed therein. Formed directly below the chamber 30 is a second housing or chamber 40 in which is mounted an electric switch 41. A knife switch is here illustrated and the movable member thereof, indicated at 42, is raised and lowered by means of a rod 43. This rod projects into the upper chamber 30 and is provided with a handle 44 by which it may be raised. The rod 43 projects above the handle and carries a valve 45, which is adapted to move into and out of register with a seat member 46 formed in a housing 47. This valve is provided for the purpose of excluding or admitting air to the cylindrical visible measuring chamber formed within the container A and its operation will later be described.

The liquid to be dispensed is in this instance supplied from an underground reservoir or storage tank 50. A pipe 51 connects the reservoir with the measuring container A. This pipe extends upwardly through the pedestal 2 and connects with a chamber 52 formed in the base member 3, said chamber 52 being separated from the measuring chamber and its outlet by the bearing plate 7. The bearing plate has one opening formed therein as indicated at 53 and the measuring pipes 12 carried by the rotor are adapted to be moved into and out of register with this opening.

For the purpose of elevating the liquid from the storage reservoir to the measuring container A, I have provided means for evacuating the chamber. This means consists of a vacuum pump 60 of suitable construction which is driven by an electric motor 61. The suction side of the pump is connected by means of a pipe 62 with the head member 4. The pipe enters the head member at 63 and communicates with a check valve 64 of the float actuated type, that is one part of the valve is raised and lowered by a float 65 which is provided for the purpose of preventing any liquid from escaping therethrough. The air controlling valve 45 is mounted on a branch 68 of the suction pipe 62 and serves the function of breaking the vacuum connection between the pump and the container A or that of admitting atmosphere to the container when the required amount of liquid has been delivered thereto.

In actual operation if a sale of gasoline is to be made, it is first necessary for the operator to open the door 31. He will next apply the hand crank 25 and simultaneously release the detent 29. Turning movement of the hand crank 25 will thus be transmitted through the gears 21 to the pinion 16 and the rotor 9, and one of the pipes will be moved into register with the opening 53. If the purchaser requires three gallons, it is only necessary that the operator continue turning the crank 25 until the detent registers with the numeral 3 formed on the dial 26. He here releases the detent and this engages one of the notches formed therein. This engagement only takes place when the proper pipe is in register with the opening 53 and it insures perfect register. The operator now grasps the lever 44 and pulls it in an upward direction. He thereby closes the switch 42 and, practically speaking, simultaneously the valve 45. The circuit is in this manner closed through the motor and the vacuum pump begins to operate. The air contained in the suction line 62 and in the container A, is in this manner exhausted and gasoline will instantly be drawn upwardly through the pipe 51 into the container and will continue discharging thereinto until a level is obtained slightly above the measuring pipe which is in register with the opening 53. The operator now releases the lever and as it, together with the valve and rod are comparatively heavy, it is obvious that the valve will be opened and similarly the switch 42. The motor and pump will instantly stop operating and air will at the same time enter and relieve the evacuated condition previously obtained. Any excess amount of gasoline delivered will now overflow through the same pipe and return to the supply reservoir and the amount required by the purchaser will thus remain in the container until it is discharged therefrom by opening a valve 70; this valve having a usual hose extension 71 and filling nozzle.

From the foregoing it should be apparent that any measuring pipe may be moved into register with the opening 53 and as these regulate the liquid level within the container, it will be impossible for the operator to deliver false measure; this being particularly true as the collars 13 are adjustable on the pipes and may be inspected and adjusted from time to time by the inspector of weights and measures. This inspector will, of course, seal the apparatus when it has been corrected, thus preventing false measure or tampering by unauthorized individuals.

The float 65 controlling the check valve 64 is only provided for the purpose of preventing overflow through the suction pipe 62. This is more or less important as the operator might unthinkingly hold the switch closed sufficiently long to permit overfilling. This, together with other features employed, renders the device foolproof, simple and easy to operate and also lessens the duties and responsibility of the attendant. It is desirable that the device should be placed in zero when not in use, hence the provision of the pin 27 and the hole 32 in the door, that is after the attendant has delivered the gasoline, it is impossible for him to close the door until the device has been returned to zero as the pin will not otherwise register and will thereby prevent closing of the door. Another reason for the pin 27 is that when it is brought around so that the door will close, the register is at zero, that is to say, the drain hole is open and any liquid remaining in the glass container will be drained into the underground tank. This is a provision demanded by the underwriters. It may furthermore be stated that the hand crank 25 must also be removed as this will prevent closure too. These certain restrictions are desirable as the apparatus might otherwise be used or tampered with if the attendant should happen to be absent for a short period. Closing of the door and locking of the same obviously prevents tampering, theft or otherwise.

The apparatus is exceedingly simple and easy to operate. Wear is reduced to a minimum as comparatively few moving parts are employed. The life and accuracy of the measuring device should therefore be comparatively long, and the general efficiency of the same comparable.

While certain features of the present invention are more or less specifically illustrated, I wish it understood that various changes in form and proportion may be resorted to within the scope of the appended claims, similarly that the materials and finish of the several parts employed may be such as the experience and judgment of the manufacturer may dictate or varying uses may demand.

Having thus described my invention, what I claim and desire to secure by Letters Patent is—

1. In an apparatus of the character described a container having a measuring chamber formed therein, means for delivering liquid thereto, a series of pipes, each terminating at a different level within the chamber, and means for bringing any pipe into communication with the liquid delivering means.

2. In an apparatus of the character described a container having a measuring chamber formed therein, a combined inlet and overflow member communicating with the chamber, a source of liquid supply connected with said member, a series of pipes each terminating at a different level within the chamber, and means for bringing any pipe into communication with said member.

3. In an apparatus of the character described a container having a measuring chamber formed therein, a combined inlet and overflow member communicating with the chamber, a source of liquid supply connected with said member, a series of pipes each terminating at a different level within the chamber, and means for bringing any pipe into register with said member.

4. In an apparatus of the character described a container having a measuring chamber formed therein, a combined inlet and overflow member communicating with the chamber, a source of liquid supply connected therewith, a rotor mounted within the chamber, a series of open ended pipes, each terminating at a different level within the chamber, said pipes being carried by the rotor, and means for turning the rotor to bring any pipe into register with the combined liquid inlet and overflow member.

5. In an apparatus of the character described a container having a measuring chamber formed therein, a combined inlet and overflow member communicating with the chamber, a source of liquid supply connected therewith, a rotor mounted within the chamber, a series of open ended pipes, each terminating at a different level within the chamber, said pipes being carried by the rotor, means for turning the rotor to bring any pipe into register with the combined liquid inlet and overflow member, and means for maintaining frictional engagement between the rotor and said member to prevent leakage therebetween.

6. In an apparatus of the character described a container having a measuring chamber formed therein, a combined inlet and overflow member communicating with the chamber, a source of liquid supply connected therewith, a rotor mounted within the chamber, a series of open ended pipes each terminating at a different level within the chamber, said pipes being carried by the rotor, means for turning the rotor to bring any pipe into register with the combined liquid inlet and overflow member, and means for adjusting the vertical height of each pipe.

7. In an apparatus of the character described a container having a measuring chamber formed therein, a combined inlet and overflow member communicating with the chamber, a source of liquid supply connected therewith, a rotor mounted within the chamber, a series of open ended pipes each terminating at a different level within the chamber, said pipes being carried by the rotor, manually operated means for transmitting a turning movement to the rotor to bring any pipe into register with the combined inlet and overflow member, and means cooperating with said manual means for determining when a certain pipe is in register and to insure perfect register.

8. In a liquid measuring and dispensing apparatus a measuring container, a bearing plate in the bottom of the container, a rotor turnably mounted thereon, a combined inlet and overflow member in the bearing plate, means forming communication between said member and a source of liquid supply, a series of open ended pipes carried by the rotor, each pipe terminating at a different level within the container, means for turning the rotor to bring any pipe into register with the combined inlet and overflow member, and means for determining and insuring perfect register of any pipe.

9. In a liquid measuring and dispensing apparatus a measuring container, a bearing plate in the bottom of the container, a rotor turnably mounted thereon, a combined inlet and overflow member in the bearing plate, means forming communication between said member and a source of liquid supply, a series of open ended pipes carried by the rotor, each pipe terminating at a different level within the container, means for turning the rotor to bring any pipe into register with the combined inlet and overflow member, means for determining and insuring perfect register of any pipe, and means for adjusting the vertical height of each pipe.

10. In a liquid measuring and dispensing apparatus, a measuring container, a bearing plate in the bottom of the container, a rotor turnably mounted thereon, a combined inlet and overflow member in the bearing plate, means forming communication between said member and a source of liquid supply, a series of open ended pipes carried by the rotor, each pipe terminating at a different level within the container, means for turning the rotor to bring any pipe into register with the combined inlet and overflow member, means for determining and insuring perfect register of any pipe, means for adjusting the vertical height of each pipe, and means for maintaining a liquid tight joint between the bearing plate and the rotor.

11. In a device of the character described, a container having a measuring chamber formed therein, a source of liquid supply, a combined delivery and return connection formed between the measuring chamber and the source of supply, means for transferring liquid from said source through the pipe to the measuring chamber, a rotor mounted within the chamber, a series of open-ended pipes carried by the rotor and each pipe terminating at a different level within the chamber, and means for turning the rotor to bring any pipe into register with the combined delivery and return connection.

In testimony whereof I have hereunto set my hand in the presence of two subscribing witnesses.

EDWARD A. RIX.

Witnesses:
W. W. HEALEY,
A. M. HEALEY.